UNITED STATES PATENT OFFICE.

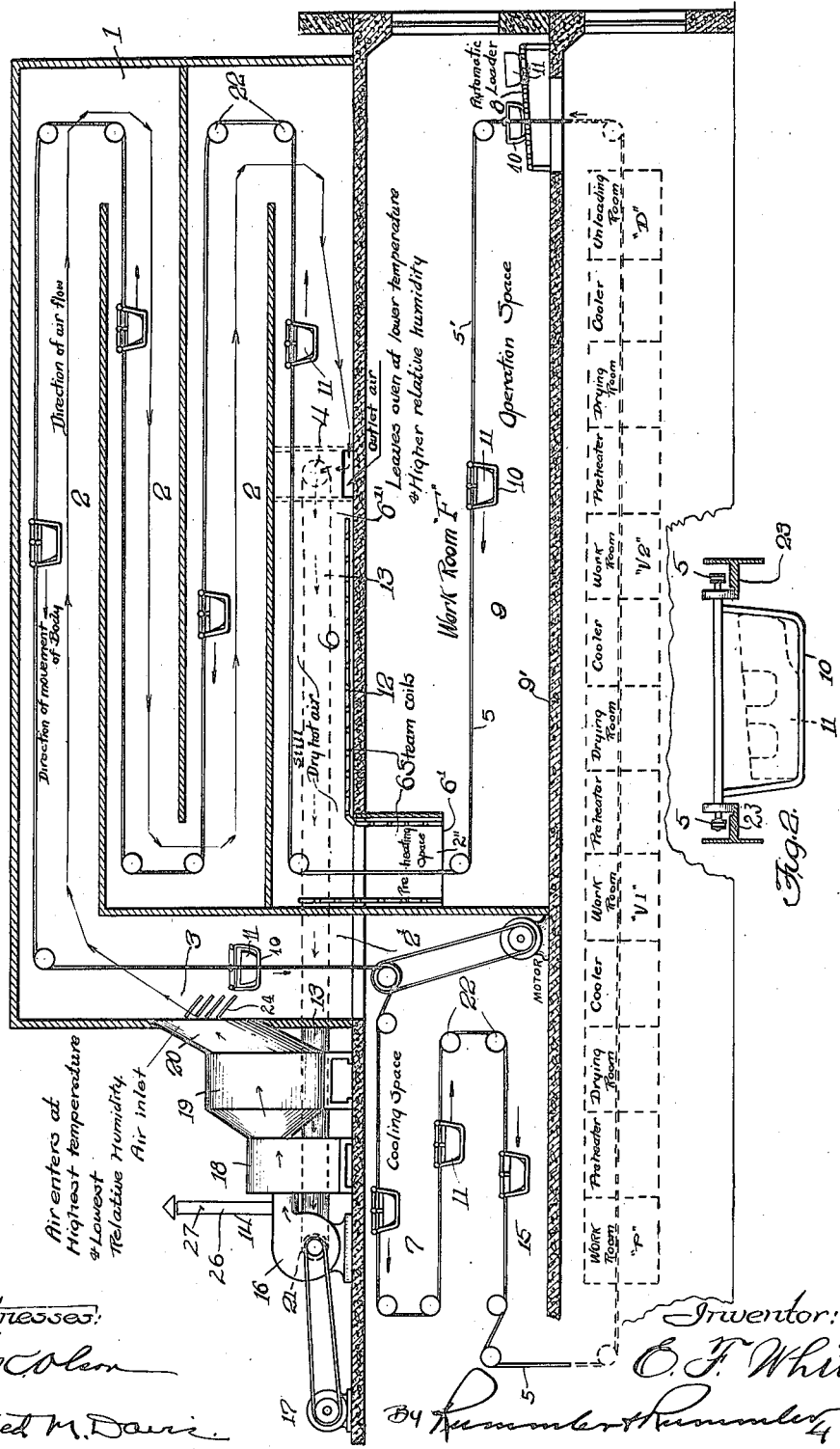

EZEKIEL FIELD WHITE, OF DETROIT, MICHIGAN.

DRYING METHOD AND MEANS.

1,424,969.  Specification of Letters Patent.  Patented Aug. 8, 1922.

Application filed January 24, 1921. Serial No. 439,637.

*To all whom it may concern:*

Be it known that I, EZEKIEL FIELD WHITE, a citizen of the United States of America, and a resident of Detroit, county of Wayne, State of Michigan, have invented certain new and useful Improvements in Drying Methods and Means, of which the following is a specification.

This invention relates mainly to the methods and means for drying coatings such as paints, enamels, undercoatings, varnishes and the like, and especially to the finishing of vehicle bodies and other objects which can be dried on conveyer systems.

In the hot oven process for drying of various coatings including siccative materials, especially those coatings containing varnish, it has been found and is now well known in the art, that a high relative humidity of the air is beneficial and insures rapid and proper drying of the coating and improves the lustre of the same. Trouble is however encountered in using an amount of moisture in the drying oven sufficiently in excess of the natural amount, because the dew point of the air in the oven is then so much above the temperature of the workroom, that when an object having the workroom temperature is brought into the oven, it chills the air in contact with it and causes condensation of moisture on the surface of the coating. The small droplets of water condensing on the surface tend to sink into the coating floating off the oil and forming pits in the coating, thereby impairing it.

As an illustration of this point, let us assume an oven with an inside atmospheric temperature of two hundred degrees Fahrenheit and a moisture content of forty grains per cubic foot of air, and an outside or workroom atmosphere having a temperature of seventy degrees Fahrenheit. The dew point of the atmosphere in the oven is then slightly less than one hundred and thirty degrees. Hence if the temperature of the body is slightly above the dew point of the atmosphere in the oven, that is one hundred and thirty degrees, then the body will readily enter the oven without the slightest condensation of moisture upon its surface.

It has also been found that in order to obtain the best results a freshly coated surface requires more moisture at the beginning of its drying operation than it does at or near the finish. I attain this ideal atmospheric condition by designing the oven in the form of a long circuitous passageway and putting the heated and properly humidified air into the oven at a point near where the body leaves the oven. The air at this point may have a relative humidity of about twenty per cent more or less. The air is passed through the oven in the direction opposite to the movement of the coated bodies.

The temperature of the air falls as it moves along, through absorption of heat by the bodies, and losses through the walls of the room, but the absolute moisture content though increased slightly by volatile constituents of the coatings remains practically the same. When therefore the air reaches the point where the coated body enters, the relative humidity of the air has changed from twenty per cent to approximately fifty per cent which is a desirable initial condition for drying siccative coatings.

The coatings are applied to the bodies under temperature and humidity conditions which are suitable for the comfort and efficiency of the workmen; for example, a temperature of seventy degrees (F.) and an absolute humidity of 5 or 6 grains per cubic foot of air.

In order to avoid condensation of moisture as the body enters the drying room, it is necessary to preheat the body, preferably after coating it, in a chamber which I prefer to call a preheating chamber. This chamber contains air with a moisture content substantially the same or only slightly above the moisture content of the air in the workroom and with a temperature sufficient to raise the temperature of the body to such point that the humid atmosphere in the adjacent end of the oven will not deposit moisture on the coating.

When these conditions are attained it is possible to dry a siccative coating in a small fraction of the time previously required. With certain coatings the lustre and durability is materially improved. By reason of thus reducing the drying time required it is possible within reasonable space to install the necessary series of ovens in progressive sequence and to apply all the coatings progressively in continuous moving succession from start to finish, which is in accord with the great continuous-process aim in modern manufacturing. As an illustration of the efficacy of this system of drying, I have been able to dry a coating in two hours that formerly required from twenty-four to forty-eight hours of air drying, and from eight to ten hours with the ordinary oven for forced drying. The economy and efficiency of this system are self evident.

I am aware that the principle of drying a siccative coating in an atmosphere containing moisture in excess of the natural humidity has long been known, but I believe that there is no prior art which anticipates my process for pre-heating the freshly coated article before its entrance into the oven containing an excess of moisture.

The main objects of this invention are to provide an improved method of finishing vehicle bodies and other articles coated with paint, varnish or the like; to provide suitable apparatus for carrying out the novel method and whereby the operation may be made substantially continuous and to a great extent automatic; to provide a method and means for rapidly drying the coatings after application to the articles treated and without the occurrence of condensation or sweating in any stage of the operation; to provide a more economical and efficient routing of the articles to be treated; to provide for gradual cooling of the articles after discharge from the heated drying chamber; and to provide an improved form of drying room, and air circulating and control means therefor.

An illustrative embodiment of this invention is shown in the accompanying drawings, in which—

Fig. 1 shows in diagrammatic form the method and preferred form of apparatus.

Fig. 2 shows a detail illustrating a cross section of the conveyer.

Referring to the drawing, the drying chamber 1 is enclosed on all sides and is provided with a circuitous passageway 2 for the articles to be treated. Provision is made for admitting attempered air at the point 3 near the work discharge end 2' of said passageway and for discharging the air at another point 4 near the work intake end 2" of said passageway.

An endless conveyer 5 extends throughout the passageway 2, through a pre-heating chamber 6 communicating therewith, and a cooling space or room 7 through which the articles are passed as they immerge from the drying room. From the cooling room 7 the conveyer returns by any convenient route to the loading platform 8 between which and the pre-heating chamber 6 is a workroom 9 where the coatings or one or more of them are applied.

The conveyer 5, for the purpose of this application, may be described briefly as a continuous belt member 5' provided with a series of carriers 10 each adapted to receive a vehicle body 11 or other article to be treated for transmission through the workroom, pre-heating chamber, drying passageway and cooling space. This conveyer moves at a slow rate so that the coat applying operation may be readily carried out by workmen standing on the floor 9' of the workroom as the articles are advanced therethrough on the conveyer.

Beginning at the loading station, the main steps of the operation are as follows:—The articles to be treated are placed on the inclined loading platform 8 from whence they are discharged automatically, subject to control by an attendant, to the several carriers as they pass by in succession. The coat of filler, paint, varnish or other material is then applied, usually by a spray brush in the hands of the operator (as understood in the art) who stands or walks beside the carrier as it moves forward through room 9. The speed of the conveyer may be about two to three feet per minute.

The next step is advancement of the carrier and its load through the pre-heating space or chamber 6. This chamber is L-shaped with a short downward part 6' and a long horizontal part 6" merging into the drying passageway proper. Both parts are provided with steam coils 12 or other heating means whereby the temperature of the coated article is raised above the dew point of the attempered air through which it is to pass as it enters the drying chamber proper or tortuous passageway 2 leading therethrough. This pre-heating assures avoidance of condensation of moisture on the body, and for this purpose it is only necessary to heat the body to a few degrees above the dew point of the attempered air at the point 4 where the air is discharged from the drying chamber and where the article enters that part of the passageway containing the attempered atmosphere.

From this point 4 the article advances through the drying passageway 2, and as it approaches the air intake 3 it meets atmospheric conditions of ever increasing temperature and decreasing relative humidity. The attempered air is drawn back from point 4 through a conduit 13 to the conditioning apparatus 14 and may be used over and over either wholly or in part.

After passing the air intake point 3 the body enters the cooling chamber 7 where it is gradually cooled to a temperature corresponding with that prevailing throughout the building. The body may be removed from the conveyer at a discharge point in this room as at 15, or it may be taken to a separate discharge room D, from which point the carriers are returned by the conveyer to the loading platform 8.

In the finishing of some articles, however, such as vehicle bodies, it is customary to apply a number of coatings including filler material, paint and varnish, in which case the article may be retained on its carrier continuously while all of the coatings are successively applied and dried, one complete set of coatings per cycle of the conveyer, after which another article takes its place and is likewise treated. For this purpose the conveyer is arranged to pass successively through several sets or groups of rooms, each group including in order a workroom, a preheating space enclosure, a drying room proper and a cooling room. The cooling room and workroom may merge and be substantially parts of the same room.

The conveyer may be hundreds of feet long and scores of carriers may be accommodated on one conveyer, so that the capacity for work may be very large. The operation as a whole is continuous during the entire working period of the day.

Referring to further details of the structure shown, the air conditioning apparatus 14 may be designed substantially as usual for such devices. It includes mainly a fan 16 driven by a motor 17, a humidifier 18, an air heater 19, a discharge conduit 20 leading to point 3 of the drying passage, and the supply conduit 13 extending from the point 4 of said passage to the center or inlet 21 of the fan.

The structure and design of the conveyer and carriers do not constitute a part of this invention, nor are the supporting and driving means therefor a part of the invention. The conveyer 5 is guided and largely supported by the stationary rollers 22. Supplementary guide and supporting means in the form of rails 23 are disposed horizontally between some of said rollers for the direct bearing of the chains 5' and carriers 10, as shown in Fig. 2.

In order to give proper direction of movement to the air as it enters the passageway 2 the induction flue 20 is inclined accordingly. Furthermore, in order to prevent the induction draft from sucking in air from the end 2' and to prevent a corresponding discharge of air at the end 2" leading to the chamber 6, a damper or vane device 24 is adjustably set at or near the point 3, so as to deflect part of the air downwardly enough to overcome the tendency of the main volume of air to disturb the equilibrium at points 2' and 2".

An exhaust flue 26 having a damper 27 is connected with the delivery side of the blower 16. By controlling the speed of the blower any desired rate of air flow within the range of the blower's capacity can be induced in the drying room, and by manipulating the dampers the extent to which the air is recirculated can be controlled. For example, if the outlet damper 27 is closed all of the air will be recirculated.

Space and heat efficiency are effected in the design of the drying room by looping the passageway back and forth on itself. The movement of the air is opposite to that of the carriers, as shown by arrows.

For the purpose of describing the cycle as a whole, as represented conventionally in Fig. 1, the first workroom where the filler coat is applied may be designated "F." The second workroom where a coat of paint may be applied is marked "P." The third workroom where the first coat of varnish may be applied is marked V' and the fourth workroom where the second coat of varnish is applied is marked V". The step details of the cycle may of course be varied to suit the requirements in various specific cases coming within the terms of the claims.

There is a substantial advantage in having the articles enter the preheating chamber from the bottom because this arrangement insures a minimum of disturbance of the air condition in said chamber through the movement of air at the entrance to said chamber. This is due to the fact that the air in said chamber is warmer than the outside air and therefore tends to remain in the chamber rather than flow out. If all of the air passing through the blower is delivered to the drying room and the dampers 24 are so arranged as to prevent the inflow of air through the outlet passage 2', the air in the preheating chamber 6 will be practically at rest and there will be complete recirculation of the air. If, however, part of the air discharged by the blower 16 is allowed to escape at the outlet vent 26, more air will be withdrawn from the drying room by the duct 13 than is delivered thereto by the blower, with the result that fresh air will be drawn into the drying room. This fresh air may be taken in through the passage 2' or through the preheating space 6, according to whether the dampers 24 are adjusted so as to favor induction of air at the passage 2' or prevent it, as has been described.

Although but one specific embodiment of apparatus for carrying out this invention is herein shown and described it is to be understood that numerous details in the construction of the apparatus shown may be altered or omitted without departing from the spirit of this invention as defined by the following claims.

I claim:

1. The method of drying a coating, which consists in heating the coated article and then passing it through an attempered atmosphere having a dew point which is lower than the temperature of said article.

2. The method of drying which consists in preheating a coated article, passing it through an attempered atmosphere which is progressively graduated upwardly as to temperature and downwardly as to relative humidity along the path of said article.

3. The method of treating an article which consists in applying a coating thereto, passing said article through an atmosphere of hot dry air and then passing it through an atmosphere of moistened air which is also heated.

4. The method of drying a coating which consists in preheating the article to which the coating is applied and then moving said article and an atmosphere of humid and progressively hot air in opposite directions, the former through the latter.

5. The method of treating an article which consists in coating the same, preheating it briefly in dry air, then subjecting it for a longer period to hot moistened air, and then cooling it to workroom temperature, and then repeating said steps.

6. The pluricyclic method of treating an article with successive coatings which consists in carrying out for each coating the cycle of coat application, dry heating, drying in a hot humid atmosphere and cooling substantially to the normal room temperature.

7. Means for treating articles to be coated comprising a circuitous passageway, a conveyer adapted and arranged to transmit the articles through said passageway, means to heat the air in said passageway adjacent to the conveyer inlet end, and means to both heat and humidify the air throughout the rest of said passageway.

8. Means for treating an article to be coated comprising, in series, a workroom where a coating may be applied, a preheating chamber provided with comparatively dry hot air, a drying chamber proper provided with air which is both heated and moistened, a place for cooling, and a conveyer provided with carriers for transmitting the said articles through said room and chambers and cooling place.

9. Pluricyclic process means for treating articles with coatings, comprising a conveyer, in combination with sets of means arranged serially along the length of said conveyer, each set including along the line of travel of said conveyer a coat applying space, a work preheating chamber, a work drying chamber containing hot humid air and a space for cooling said articles.

10. A drying apparatus of the character described comprising an elongated passageway which is open at both ends, means to induct attempered air adjacent to one of said ends and to educt said air adjacent to the other of said ends, and means adjacent to the point of induction for said air to adjust and determine the direction of air flow in said passageway and at the ends thereof.

11. A drying apparatus of the character described comprising an elongated passageway which is open at both ends, means to induct attempered air adjacent to one of said ends and to educt said air adjacent to the other of said ends, and means adjacent to the point of induction for said air to adjust and determine the direction of air flow in said passageway and at the ends thereof, the last mentioned means comprising an induction passage positioned to direct the air inwardly toward the remote end and an adjustable baffle disposed in alinement with said passage to retard and deflect some of the air backward toward the adjacent end.

12. A drying apparatus of the character described comprising an elongated passageway which is open at both ends, means to induct attempered air adjacent to one of said ends and to educt said air at a point spaced inward from the other of said ends, wherefore there remains adjacent the second mentioned end a space for still air, and means to heat the air in said space.

13. A drying apparatus of the character described comprising an elongated passageway which is open at both ends, means to induct attempered air adjacent to one of said ends and to educt said air at a point spaced inward from the other of said ends, wherefore there remains adjacent the second mentioned end a space for still air, an endless conveyer extending through said passageway and movable from the still air end to the air induction end, and means to heat the air in said space.

Signed at Chicago this 21st day of January 1921.

EZEKIEL FIELD WHITE.